United States Patent Office 3,506,313
Patented Apr. 14, 1970

3,506,313
VEHICLE BRAKE PRESSURE CONTROL MEANS
Thomas G. Lawson, Birmingham, England, assignor to Girling Limited
Filed Sept. 12, 1968, Ser. No. 759,325
Claims priority, application Great Britain, Sept. 14, 1967, 41,914/67
Int. Cl. B60t 8/18
U.S. Cl. 303—22                              8 Claims

ABSTRACT OF THE DISCLOSURE

Brake pressure control valve structure for use with a brake pressure control valve having a movable operating member, comprising a sleeve rotatable about a fixed axis and adapted to act upon the said valve member, a pin passing axially through the sleeve and a brake control spring having one of its ends attached to the sleeve for applying a resilient rotary force thereto, wherein the sleeve and pin have axially aligned radial apertures therethrough to receive the end of the control spring, and the pin and sleeve can be moved axially to clamp the spring end by a clamping device (such as a screw).

---

This invention relates to vehicle brake pressure control means of the type including a movable member whose loading determines the operating characteristics of the valve, and which is subjected through the intermediary of control spring means, to a force which varies according to the loading of the vehicle.

The invention is particularly concerned with the manner in which the control spring means is coupled to a member which acts upon the movable member of the valve.

In accordance with the invention there is provided brake pressure control means for use with a brake pressure control valve having a movable operating member, comprising a sleeve rotatable about a fixed axis and adapted to apply a force to the movable operating member, a pin passing axially through the sleeve, the pin and sleeve having aligned, radially extending apertures therethrough, a control spring having an end portion extending through the said apertures, and clamping means for effecting relative axial displacement of the sleeve and pin to trap the end of the spring therebetween.

In some embodiments the said clamping means comprises a screw threaded into an axially extending bore in the pin and acting against the end of the spring to stress the end in double shear against the sleeve, which has limited freedom of axial movement relative to the pin.

Axial movement of the sleeve on the pin is limited in one embodiment by a shear pin passing through the member; in another embodiment by an abutment on the pin; and in another by the end of a second control spring also passing through aligned radial apertures in the sleeve and pin, so that it is clamped thereto in similar fashion.

In another embodiment, the sleeve is in separate portions, of which a first central portion is keyed to the pin, and two end portions are axially movable by means of clamping means, in the form of screws acting between the end portions and the adjacent ends of the pins, and the sets of radial apertures to receive the ends of two control springs are formed through the said end portions.

Some embodiments of the invention will now be described in detail, with reference to the accompanying drawings, in which.

Figure 1:
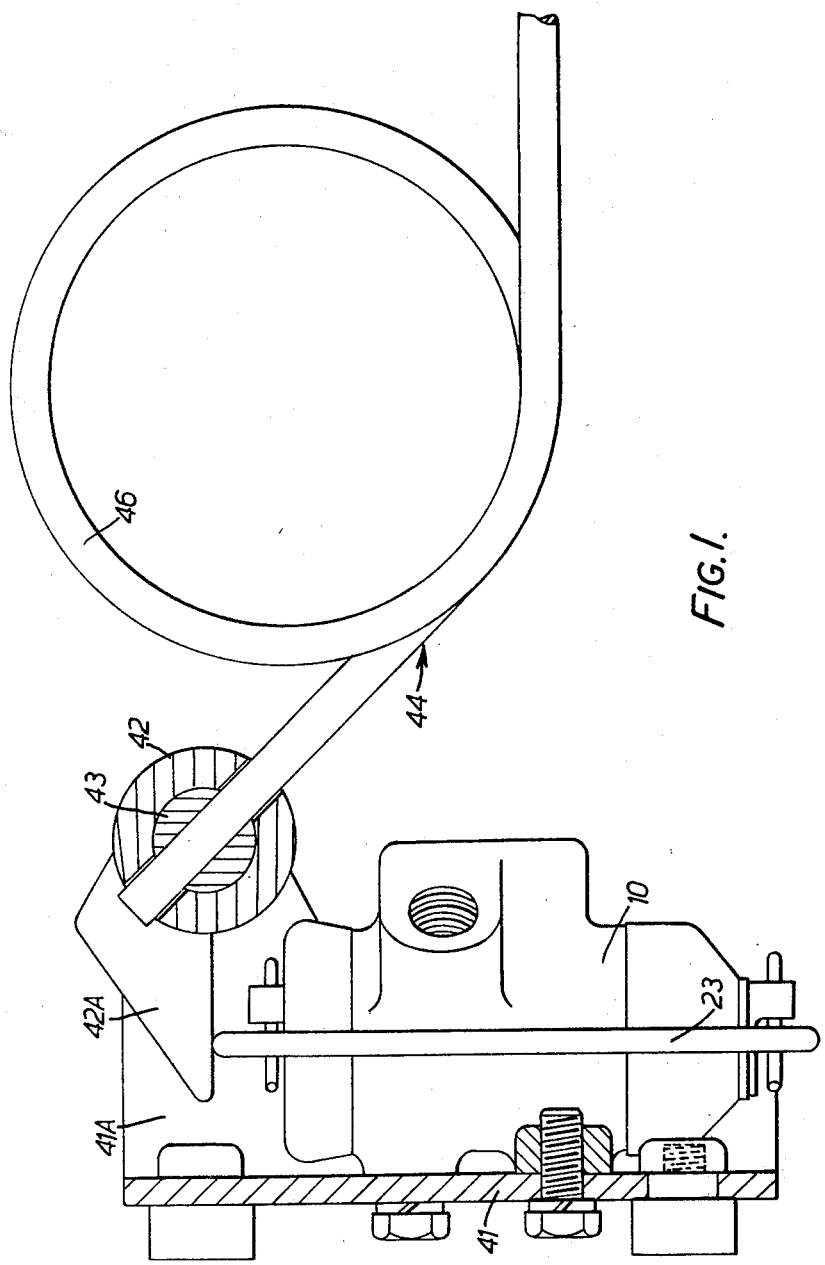
FIGURE 1 is a part sectional elevation of one form of brake pressure control means in accordance with the invention.

The control means shown in FIGURE 1 comprises a brake pressure control valve 10 having a movable member 23 whose loading determines the operating characteristics of the valve, and in particular the cut-off point of the valve. The valve is mounted on the base portion of a bracket 41 of channel cross section, in the opposed, parallel limbs or side portions 41A of which is journalled a pivot pin 43. Mounted on the pin is a sleeve 42 having a radial arm 42A which acts as a valve operating lever upon the member 23. Sleeve 42 is biased anti-clockise, as seen in FIGURE 1, by the action of a control spring means 44.

This spring is in the form of a cantilever, the free end of which is provided with an eye or other suitable means for connection to an unsprung part, usually the rear axle of the vehicle. Intermediate its ends the spring has a coil portion 46. The spring is formed of two side-by-side sections arranged co-extensively, with the coil portions in register but spiralling in opposite directions. In use, variations in vehicle loading vary the stress in the coil portion 46 and thus vary the spring force exerted on the member 23.

Figure 2:
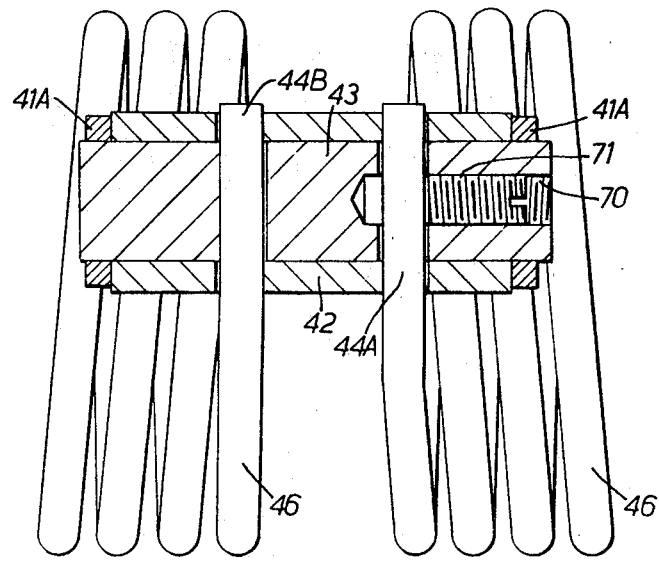
FIGURE 2 is a sectional elevation on the line II—II of FIGURE 1.

The coupling of the spring means to the pin 43 and sleeve 42 is best seen in FIGURE 2. The sleeve and pin are formed with two sets of aligned radial apertures through which are inserted the adjacent end portions 44A and 44B of the control spring sections. The pin has an axially directed, screw threaded hole 70 to receive a grub screw 71. When the screw 71 is advanced in the hole 70 it engages the adjacent spring end 44A and, if the pin is regarded as remaining stationary, the spring end 44A is moved to the left carrying with it the sleeve 42. Axial movement of the sleeve is limited by the spring end 44B, in turn restrained by engagement with pin 43. Thus, the two spring ends are trapped between the pin and sleeve. The spring ends are stressed in double shear, the sleeve in compression and the pin in tension, and the spring ends are firmly keyed to the sleeve.

Figure 3:
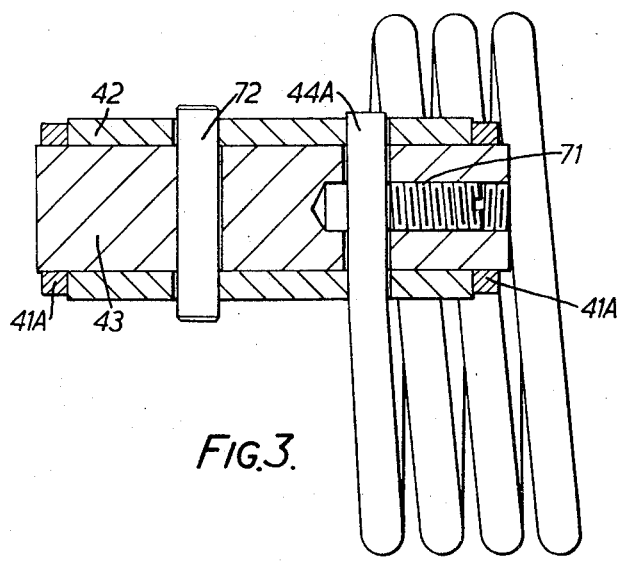
FIGURES 3, 4 and 5 are views corresponding to FIGURE 3 of second, third or fourth embodiments of the invention.
Figure 4:
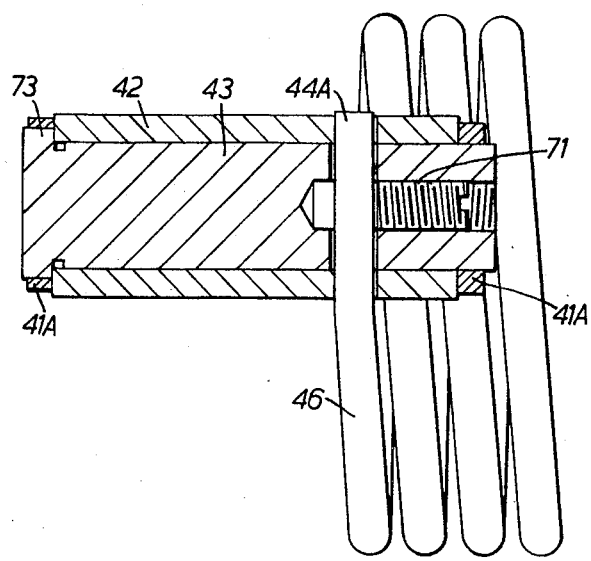

In the embodiments shown in FIGURES 3 and 4, there is only one spring end to trap, since the control spring comprises but a single section. In such a case, the reaction provided in FIGURE 2 by the second spring end 44B has to be obtained in some other fashion. In FIGURE 3, a transverse pin 72 is stressed in double shear, and in FIGURE 4, axial movement of the sleeve relative to the pin is limited by a head 73 on the pin.

Figure 5:
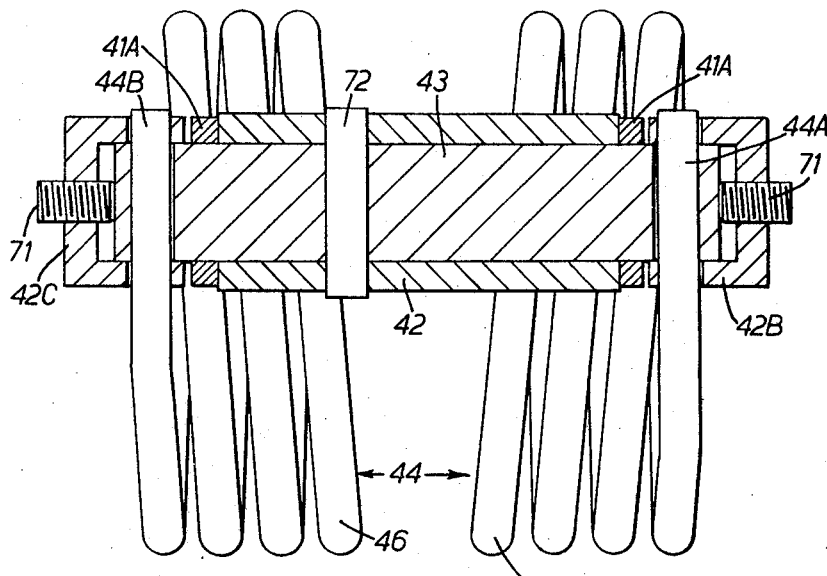

In the embodiment shown in FIGURE 5, the sleeve is in three separate portions, a first central portion 42, keyed to the pin 43 by a dowel 72, and two end portions 42B and 42C having end walls which receive clamping screws 71 and cylindrical side walls having radial apertures to receive the ends 44A and 44B of two control springs. These spring ends are clamped between the respective sleeve portions and the pin by the action of tightening the screws 71 against the adjacent ends of the pin 43, to clamp the spring ends and stress them in double shear as previously described. The central sleeve portion 42 is mounted between the bracket side portions 41A, and the end portions 42B and 42C are mounted outside the side portions.

The above described arrangements provide effective means for coupling the spring ends to the rotatable members, involving a minimal number of component parts and a quick and simple operation to assemble or dismantle the parts.

It would, of course, alternatively be possible to mount the valve on an unsprung vehicle part and connect the spring to a sprung part.

I claim:

1. A brake pressure control means for use with a brake pressure control valve having a movable member, comprising a support structure; a sleeve mounted on said structure for rotation about a fixed axis and adapted to apply a force to said movable member; a pin extending axially through said sleeve and rotatable therewith; a set of aligned, radial apertures through said pin and sleeve; a control spring having an end extending through said apertures; and clamping means for effecting relative axial displacement of said pin and sleeve to trap said spring end therebetween.

2. Brake pressure control means as claimed in claim 1, comprising a bracket member having a base portion and a pair of opposed parallel side portions, a brake pressure control valve having a movable operating member and mounted on said base portion between said side portions, and wherein said pin and sleeve are journalled for rotation about said axis by said side portions and said sleeve has a radial arm which acts upon said movable valve member upon rotation of said sleeve.

3. Brake pressure control valve means as claimed in claim 1, wherein said clamping means comprises a screw having threaded engagement in an axial hole in said pin, said screw bearing against said spring end.

4. Brake pressure control means as claimed in claim 1, comprising a shear pin extending through a further set of aligned radial apertures in said pin and sleeve to limit relative axial movement thereof.

5. Brake pressure control means as claimed in claim 1, wherein a set of aligned radial apertures is formed through said pin and sleeve, and comprising a second control spring having an end received in said apertures and trapped by the action of said clamping means.

6. Brake pressure control means as claimed in claim 1, wherein said sleeve comprises first and second sleeve portions formed separately from each other, said first portion is adapted to load said movable member, said second portion has said aligned apertures therethrough, and said clamping means acts between said pin and said second sleeve portion.

7. Brake pressure control means as claimed in claim 6, comprising a third sleeve portion, further clamping means associated with said third sleeve portion, a set of aligned apertures through said third sleeve portion and said pin, and a second control spring having an end received in the last said aligned apertures and trapped by said pin and third sleeve portion.

8. Brake pressure control means as claimed in claim 6, wherein said second sleeve portion has an end wall with a screw threaded hole therethrough and said clamping means consists of a screw having threaded engagement in said hole and abutting engagement with an adjacent end of said pin.

References Cited

UNITED STATES PATENTS

| | | | |
|---|---|---|---|
| 3,285,673 | 11/1966 | Dobrikin | 303—22 |
| 3,329,471 | 7/1967 | Oberthur | 303—22 |
| 3,413,042 | 11/1968 | Herold | 303—22 X |

MILTON BUCHLER, Primary Examiner

J. J. McLAUGHLIN, JR., Assistant Examiner

U.S. Cl. X.R.

188—195